US006204544B1

United States Patent
Wang et al.

(10) Patent No.: US 6,204,544 B1
(45) Date of Patent: Mar. 20, 2001

(54) LATERALLY MOVABLE GATE FIELD EFFECT TRANSISTORS FOR MICROSENSORS AND MICROACTUATORS

(75) Inventors: Xiaodong Wang, Austin, TX (US); Pratul K. Ajmera, Baton Rouge, LA (US)

(73) Assignee: Board of Supervisors of Louisiana State University and Agricultural and Mechanical College, Baton Rouge, LA (US)

( * ) Notice: Subject to any disclaimer, the term of this patent is extended or adjusted under 35 U.S.C. 154(b) by 0 days.

(21) Appl. No.: 09/249,193

(22) Filed: Feb. 12, 1999

(51) Int. Cl.[7] .......................... H01L 29/82; H01L 27/14; H01L 29/84; H01L 23/58
(52) U.S. Cl. .......................... 257/417; 257/415; 257/252; 257/253
(58) Field of Search .......................... 257/417, 252–254, 257/415, 420; 333/186; 430/296; 438/53, 239, 275, 456

(56) References Cited

U.S. PATENT DOCUMENTS

| 5,045,497 | 9/1991 | Hayashi et al. | 437/175 |
| 5,290,664 | 3/1994 | Matsumoto | 430/296 |
| 5,455,547 | 10/1995 | Lin et al. | 333/186 |
| 5,541,437 | 7/1996 | Watanabe et al. | 257/417 |
| 5,627,397 | 5/1997 | Kano et al. | 257/417 |
| 5,818,093 | 10/1998 | Gutteridge et al. | 257/417 |

OTHER PUBLICATIONS

Edmans, D. et al., "Micromachined accelerometer with a movable gate transistor sensing element," Proceedings of 1997 SPIE Symposium on Micromachining and Microfabrication, SPIE vol. 3224, pp. 37 ff Austin, Tx, Sep. 29–30, 1997).

Kloeck, B. et al., "Motion Investigation of Electrostatic Servo–Accelerometers by Means of Transparent ITO Fixed Electrodes," Hitachi Research Laboratory, *IEEE* pp. 108–111 (1991).

Nathanson, H. et al., "The resonant gate transistor," *IEEE Trans. Electron Devices*, vol. ED–14, pp. 117–133 (1967).

Stadler, S. et al., "Integrated acceleration sensors compatible with the standard CMOS circuitry," Proc. Intl. Symp. Microelectronics, Los Angeles, CA, pp. 95–100 (Oct. 24–26, 1995).

Stadler, S., "Integration of a post–fabricated accelerometer on a chip with standard CMOS circuitry using deep X–ray lithography," MS thesis, Louisiana State University, Baton Rouge, LA (Aug. 1997).

(List continued on next page.)

*Primary Examiner*—Sara Crane
*Assistant Examiner*—Cuong Quang Nguyen
(74) *Attorney, Agent, or Firm*—John H. Runnels

(57) ABSTRACT

A field effect transistor is disclosed whose output is modulated by a control gate that is movable in a direction parallel to the transistor substrate surface. The device is capable of lateral motion with large amplitude (tens of micrometers) with appropriate selection of gate materials and design. The transistors may be used in microsensors or microactuators. When used as a microsensor, the gate may be driven parallel to the substrate by the force to be measured (such as an inertial force). When used as a microactuator, the gate may be driven by an actuating drive such as an electrostatic, magnetic, or thermal actuation. The device measures or controls the displacement of a mechanical structure parallel to the transistor substrate. The change in the output current of the transistor is a linear function of the in-plane displacement of the gate, allowing direct mechanical displacement-to-current conversion. This direct, linear conversion provides improved sensitivity, improved signal-to-noise ratio, and improved signal conditioning and signal processing. It allows precise measurement, actuation, and control of lateral displacement.

2 Claims, 2 Drawing Sheets

OTHER PUBLICATIONS

Stadler, S. et al., "Integration of LIGA structures with CMOS circuitry," Proc. SPIE Symp. Smart Structures and Materials, vol. 3046, pp. 230–241, San Diego, CA (Mar. 4–6, 1997).

Tang, W. et al., "Laterally driven polysilicon resonant microstructures," *Sensors and Actuators*, vol. 20, pp. 5–32 (1989).

Yoshikawa, A. et al., "Properties of a movable–gate–field–effect structure as an electromechanical sensor," *J. Acoust. Soc. Am.*, vol. 64, pp. 725–730 (1978).

LATERALLY MOVABLE GATE FIELD EFFECT TRANSISTORS FOR MICROSENSORS AND MICROACTUATORS

The benefit of the Feb. 20, 1998 filing date of provisional application nnnnn (which was a conversion of nonprovisional application 09/027,398) is claimed under 35 U.S.C. §119(e).

This invention pertains to transistors with laterally movable gates, and to the application of such transistors to microsensors and microactuators.

There is a continuing, unfilled need for improved microsensors and microactuators. Current microsensor technologies rely on principles such as measuring extremely small changes in capacitance of a moving part. The inherent difficulty of measuring such small changes in capacitance is compounded by large stray capacitances attributable to bonding pads or to relatively long electrical connections. Many currently available microsensors exhibit low sensitivity, low mechanical stability, and nonlinearity.

D. Edmans et al., "Micromachined accelerometer with a movable gate transistor sensing element," *Proceedings of 1997 SPIE Symposium on Micromachining and Microfabrication, SPIE* vol. 3224, pp. 37 ff (Austin, Tex, Sep. 29–30, 1997); A. Yoshikawa et al., "Properties of a movable-gate-field-effect structure as an electromechanical sensor," *J. Acoust. Soc. Am.,* vol. 64, pp. 725–730 (1978); and H. Nathanson et al., "The resonant gate transistor," *IEEE Trans. Electron Devices,* vol. ED-14, pp. 117–133 (1967) each disclose transistors having a moving gate, in which the gate moves perpendicular to the substrate, for example as a cantilever. The gate thus always remains over the active channel area of the device, with the distance to the channel varying. The response of such a device is generally nonlinear. Also, the vertical range of travel is low (on the order of 1 $\mu$m); and a relatively large actuating voltage is required to accomplish this small range of travel.

We have discovered a field effect transistor whose output is modulated by a control gate that is movable in a direction parallel to the transistor substrate surface. The device is capable of lateral motion with large amplitude. With appropriate selection of gate materials and design, the extent of lateral motion may be tens of micrometers—10 $\mu$m, 20 $\mu$m, or even more. Prior techniques for making perpendicularly movable gates are not applicable to the case of a laterally movable gate, particularly due to the need to maintain a gap between the gate and an insulator-coated substrate that is constant within a tolerance on the order of a fraction of a micrometer. The novel transistors may be used in microsensors or microactuators. When used as a microsensor, the gate may be driven parallel to the substrate by the force to be measured (such as an inertial force). When used as a microactuator, the gate may be driven by an actuating drive such as an electrostatic, magnetic, or thermal actuation, and the measured position of the gate provides feedback to control the operation of the actuator.

The novel device allows measurement or control of the displacement of a mechanical structure in a direction parallel to the transistor substrate. The in-plane motion of the mechanical structure, induced by an inertial force, an electrostatic force, or other force is measured by the change in the FET current. The signal from the transistor can be used as feedback to control the in-plane motion of the structure if desired. The gate of the FET is a part of (or is connected to) the structure in motion. The change in the output current of the transistor is a linear function of the in-plane displacement of the gate, allowing direct mechanical displacement-to-current conversion to be achieved. This direct, linear conversion provides improved sensitivity, improved signal-to-noise ratio, and improved signal conditioning and signal processing. It allows precise measurement, actuation, and control of the lateral displacement.

With the movable gate outside the channel, the conduction channel of the transistor may be either normally conducting (depletion type) or normally off (enhancement type). The position of the gate over the channel modulates the channel conductance. By suitable choice of geometries, the device may be designed so that, within a suitable range of applied gate bias voltages, the position of the gate is directly proportional to the transistor source-to-drain current; i.e., the response is linear over this range.

The gate may be formed as a thin film or a high aspect ratio structure, with an initial position either over, partially over, or outside the transistor conduction channel. The channel is coated with an insulator, preferably on the order of tens of nm thick. The insulator may, for example, comprise silicon dioxide, silicon nitride, or a two-layer insulator in which a silicon dioxide layer directly contacts the underlying substrate, and a silicon nitride layer covers the silicon dioxide layer. In a preferred manufacturing technique, the gate is fabricated as a high aspect ratio mechanical structure by a process such as deep X-ray lithography and electroforming, or as a thin film structure made by surface micromachining. The problem of stray capacitance encountered by other devices is avoided. The nature of the novel transistor readily admits feedback capability.

Advantages of the invention include a direct, linear relation between the mechanical position of the gate and the drain current of the transistor, a high sensitivity to force or position, the possibility of efficient closed-loop feedback control, compatibility with very large scale integrated circuit fabrication, high signal-to-noise ratio due to high sensor sensitivity and low parasitic capacitance, and a high quality factor due to low damping of motion.

Applications of the novel device include the following: electromechanical switches, position sensors, actuators, manipulators, frequency-based signal processors, accelerometers, multi-dimensional accelerometers, automotive sensors, sensors for manufacturing process monitoring and control, gyroscopes, and aviation systems.

Two types of field effect transistor (FETs) are in common use: n-channel devices and p-channel devices. Either type may either be normally on (a depletion type device) or normally off (an enhancement type device). The novel laterally movable gate may be used with any of these devices: n-channel, p-channel, deletion type, and enhancement type.

The drain current $I_{DS}$ in a FET may be expressed as follows for an n-channel device:

$$I_{DS}=(C_g W\mu/2L)[2(V_{GS}-V_T)V_{DS}-V_{DS}^2] \qquad (1)$$

for $V_{DS}<(V_{GS}-V_T)$; or $$I_{DS}=(C_g W\mu/2L)(V_{GS}-V_T)^2 \qquad (2)$$

for $V_{DS}\geq(V_{GS}-V_T)$ where $V_{GS}$ is the gate-to-source voltage, $V_{DS}$ is the drain-to-source voltage, $V_T$ is the threshold voltage at which the conduction channel begins, $C_g$ is the gate capacitance per unit gate area, $\mu$ is the channel carrier mobility, W is the width of the channel and L is the channel length. The drain-source current is a function of the gate-source voltage, either alone or in combination with the drain-source voltage. Note in both of the above equations the linear relationship between the current $I_{DS}$ and the lateral gate displacement W. (Note also that the same general relationships hold for a p-channel device, with appropriate changes in the polarity of the bias voltages and the direction of current.)

Figure 1A:
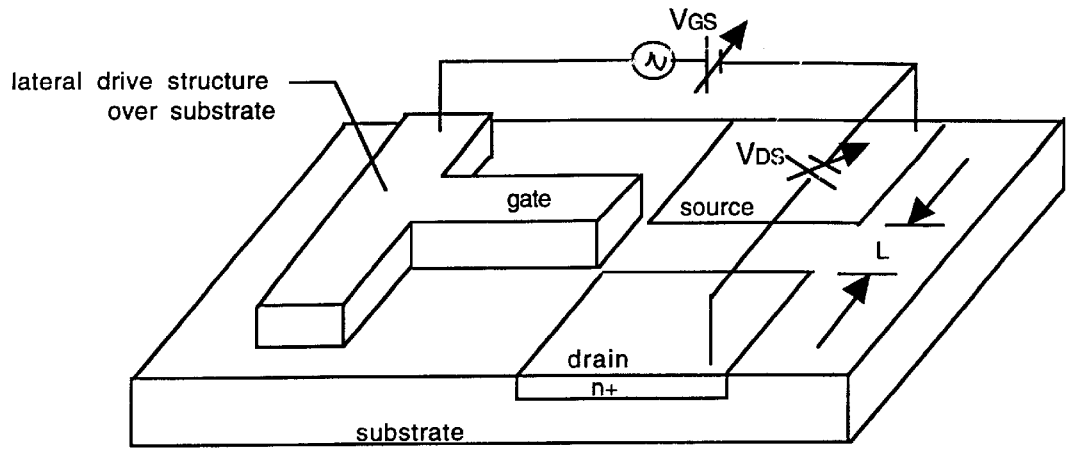
FIGS. 1(*a*) and 1(*b*) illustrate a simple embodiment of the laterally movable gate field effect transistor.
Figure 1B:
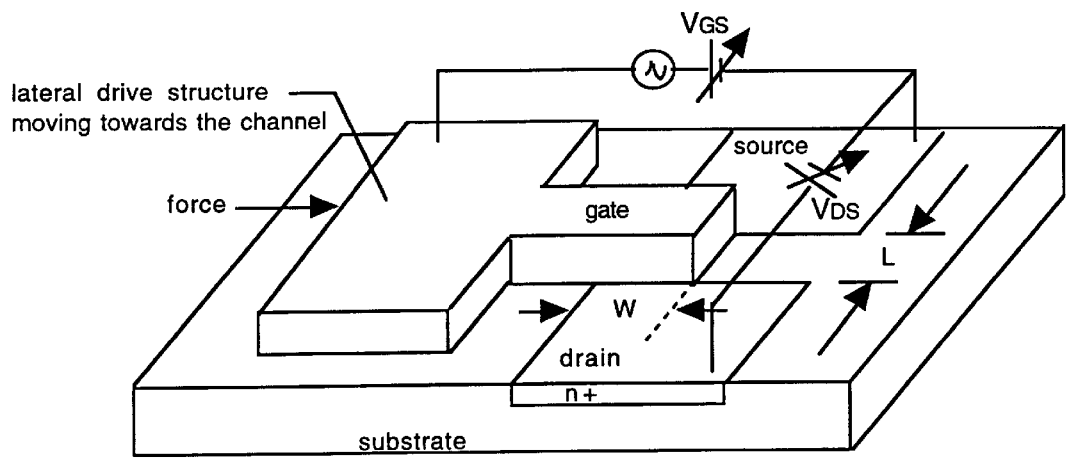

FIGS. 1(a) and 1(b) illustrate a simple embodiment of the laterally movable gate FET, to demonstrate the basic operating principles. The device converts lateral displacement W directly into a change in the current through the device. For purposes of illustration, an n-channel device is depicted in FIGS. 1(a) and 1(b). The same observations apply to a p-channel device, with appropriate changes in the polarity of the bias voltages and direction of current.

In FIG. 1(a), the suspended gate structure is shown outside the channel region of the FET. Depending on the application, it could also be located partially or completely over the channel region. As shown in FIG. 1(b), when an in-plane force is applied to the gate structure in a direction towards the channel region, the channel resistance between the source and the drain is modulated. The amount of modulation depends on the bias voltage and the transistor characteristics. If the transistor is an enhancement-type device, and if the gate bias is greater than the threshold voltage, then a conduction channel is established when the gate moves laterally over the channel. The output current of the transistor is then a linear function of the lateral displacement of the gate, as given by equation (1) or (2) above. When used as an accelerometer, the lateral drive comes from an inertial force, and an electrostatic actuation mechanism can be added to the device to provide feedback overload protection. When used as an actuator, the lateral drive comes from an electrostatic, thermal, magnetic, or other force, and accurate measurement and control of the in-plane displacement is derived from the linear displacement-to-current relationship.

Most of the device (those components other than the movable gate and its direct accessories) may be manufactured using standard circuit fabrication techniques known in the art. Silicon is a preferred substrate material, as it is the most commonly used material in the electronics industry. Other substrate materials may also be used, such as gallium arsenide or silicon carbide. If the device is a part of a more complex circuit, a part of the movable gate optionally may be fabricated along with much or all of the remaining portions of the circuit at the same time.

The movable gate structure may be manufactured by at least two different techniques. One approach is to use surface micromachining techniques to form the gate. See, e.g., W. Tang et al., "Laterally driven polysilicon resonant microstructures," *Sensors and Actuators*, vol. 20, pp. 25–32 (1989). A polysilicon layer a few micrometers ($\mu$m) thick is used to form the movable structure. The structure is made movable by etching away a sacrificial layer. Materials compatible with the integrated circuit are used as the sacrificial layer, for example phosphosilicate glass. The limited strength of polysilicon and its limited thickness will limit this approach to devices having a restricted degree of lateral motion, on the order of a few micrometers. The device is compatible with integrated circuit fabrication technology, and permits full integration of the laterally movable gate FET with other circuitry on the same chip with appropriate sequencing of fabrication steps known in the art. If desired, an array of several laterally movable gate FETs may be fabricated on a single chip to enhance the performance of the device. We have previously demonstrated the freeing of other movable polysilicon mechanical structures (cantilevered beams) that are compatible with CMOS integrated circuit fabrication processes. See S. Stadler et al., "Integrated acceleration sensors compatible with the standard CMOS circuitry," *Proc. Intl. Symp. Microelectronics*, Los Angeles, Calif., pp. 95–100 (Oct. 24–26, 1995).

An alternative approach to fabricating the movable gate structure FET that overcomes many of the disadvantages of the surface micromachining technique is a high aspect ratio LIGA technique. "LIGA" is the German acronym for "Lithographie, Galvanoformung, Abformung" (a technique incorporating deep X-ray lithography, electroforming, and molding). The aspect ratio is preferably at least about 5, more preferably at least about 10, and may be 20, 50, 100 or higher, depending on the application. The source and the drain of the FET are fabricated on a chip, along with other circuitry if desired. Subsequently, the movable gate structure is fabricated using the LIGA technique. For example, sputter-deposited titanium may be used as the sacrificial layer, and the movable gate structure may be formed by electrodeposition of nickel. The details of this fabrication technique (using cantilever beams as examples) are disclosed in S. Stadler et al., "Integration of LIGA structures with CMOS circuitry," *Proc. SPIE Symp. Smart Structures and Materials*, vol. 3046, pp 230–241, San Diego, Calif. (Mar. 4–6, 1997); and S. Stadler, "Integration of a post-fabricated accelerometer on a chip with standard CMOS circuitry using deep X-ray lithography," MS thesis, Louisiana State University, Baton Rouge, La. (August 1997). See also published international patent application WO 96/07954, international publication date Mar. 14, 1996.

An advantage of the LIGA process over the surface micromachining technique is that LIGA allows the formation of thicker layers for the movable structures. The LIGA fabrication technique can produce structures several tens or even hundreds of micrometers high, and hence provides flexibility in the design of the movable structure. Such height imparts mechanical strength, inhibiting undesirable bending during motion. LIGA also allows the use of materials such as nickel with higher intrinsic strengths. Also, during fabrication the movable gate structure may be located away from the active channel area of the device as shown in FIG. 1(a), permitting effective shielding of the active area with a thick absorber on the X-ray mask. The shielding prevents radiation damage due to X-rays during the deep exposure process, damage that could otherwise result in reduced transistor performance.

We have made conservative estimates of the performance of laterally movable gate FETs. For a device operating in the saturated mode ($V_{DS} \geq (V_{GS}-V_T)$), with a carrier channel mobility of 1000 cm$^2$/Vs, a gap between the gate and the substrate $d_g$ of 1 $\mu$m, a channel length L of 5 $\mu$m, and a gate oxide layer of 50 nm or less, the sensitivity of the lateral displacement of the device is $$\Delta I_{DS}/\Delta W \approx (\epsilon_o \mu/2 d_g L)(V_{GS}-V_T)^2,$$

which equals 35.4 $\mu$A/$\mu$m for $V_{GS}-V_T=20$ V. If ($V_{GS}-V_T$) is reduced to 10 V, the sensitivity becomes 8.9 $\mu$A/$\mu$m. The measurement of currents in this range is routine in the art. A smaller gap would improve sensitivity further. We have, for example, for other purposes made a suspended structure (a cantilever) in our laboratory, in which there was only a 0.6 $\mu$m gap between the structure and the substrate.

Figure 2:
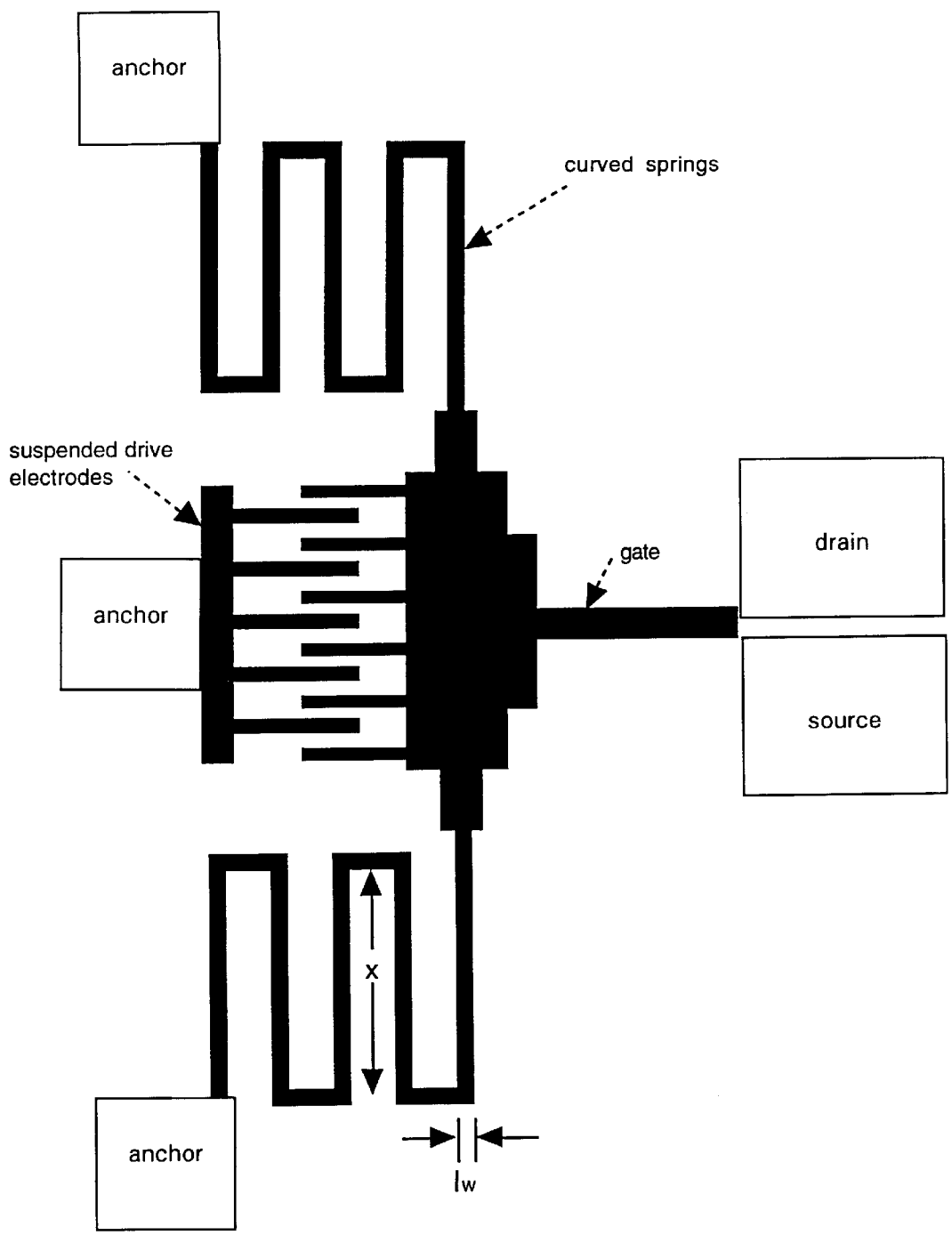
FIG. 2 illustrates an alternative embodiment of the laterally movable gate field effect transistor.

An alternative embodiment of the laterally movable gate FET is shown in FIG. 2. The gate is connected to two curved spring tethers, each comprising a number of curved springs. Each spring is clamped at one end, and the other is free to be deflected by a force load. The gate is also, for example, connected to a comb-finger array of electrodes that may be electrostatically driven by the charge on a complementary array of comb-finger electrodes. For example, if x=500 μm, $1_w$=10 μm, h=200 μm, E≈$10^{11}$N/m$^2$, A=h×δ, δ=5 μm, V=50 V, M=20 and S=20, then the electrostatic force generated from the comb-drive electrodes is 17.7 μN, and the resulting displacement of the gate structure towards the transistor channel is 8.9 μm. Here, x, $1_w$, and h are the length, width and the height of each of the spring tether respectively; E is the Young's modulus of nickel, A is the effective area of the plate, V is the drive voltage, δ is the gap between a pair of fingers in the drive electrodes, M is the number of comb-drive fingers, and S is the number of folds in the spring tether. The total length of the structure in the above example is 4000 μm. If x=1000 μm, with all other parameters remaining the same, then the displacement would be 70.8 μm.

More generally, the lateral displacement of the gate structure depends on the stiffness of the suspension and the details of the design of its configuration. As another example, for a 60 μm high, 4 mm long nickel structure in a typical comb-driven configuration, a 10 μm lateral displacement is achieved for a 30 V drive voltage; and a 25 μm lateral displacement is obtained at 50 V drive voltage in a configuration in which the two ends are clamped and the drive force applied at the center. Note that the voltage applied to actuate the structure electrostatically is separate from the gate and drain voltages on the FET.

The complete disclosures of all references cited in this specification are hereby incorporated by reference. In the event of an otherwise irreconcilable conflict, however, the present specification shall control.

We claim:

1. A microactuator comprising an actuator and a field effect transistor; wherein said transistor comprises a source, a drain, a gate, and an insulator; and wherein:

(a) at least one surface of said source and at least one surface of said drain are coplanar, wherein the coplanar region between these surfaces of said source and said drain is defined to be the channel of said transistor;

(b) said insulator covers the channel;

(c) said gate is laterally movable in a plane that is parallel to the channel of the transistor, such that the portion of the channel that is covered by said gate varies as said gate moves in this parallel plane, and such that at least a portion of said gate covers said source, and such that at least a portion of said gate covers said drain;

(d) when at least a portion of said gate covers the channel, then a voltage on said gate beyond a pre-determined threshold voltage, in conjunction with a voltage between said drain and said source, induces a drain current between said source and said drain; wherein the drain current is a linear function of the portion of the channel that is covered by said gate; and (e) said gate is connected to said actuator, whereby the drain current measures the position of said gate and of said actuator.

2. A microactuator as recited in claim 1, additionally comprising a controller to control the position of said actuator in response to the drain current.

* * * * *